United States Patent [19]

Hönel et al.

[11] Patent Number: 5,055,542

[45] Date of Patent: Oct. 8, 1991

[54] CARRIER RESIN FOR PIGMENT PASTES, PREPARATION AND USE THEREOF

[75] Inventors: Michael Hönel; Peter Ziegler, both of Mainz; Walter Sprenger, Dieburg; Wolfgang Wendt, Wuppertal, all of Fed. Rep. of Germany

[73] Assignee: Hoechst Aktiengesellschaft, Frankfurt, Fed. Rep. of Germany

[21] Appl. No.: 365,527

[22] Filed: Jun. 13, 1989

[30] Foreign Application Priority Data

Jun. 15, 1988 [DE] Fed. Rep. of Germany ....... 3820300

[51] Int. Cl.$^5$ ...................... C08G 18/71; C08G 18/80; C09D 17/00; C09D 169/00; C09D 175/00; C09D 175/12

[52] U.S. Cl. ........................................ 528/45; 528/69; 528/370; 528/422; 525/453; 525/459; 525/523; 525/528; 525/540

[58] Field of Search .................. 528/370, 45, 422, 69; 525/453, 459, 540, 523, 528

[56] References Cited

U.S. PATENT DOCUMENTS

| | | | |
|---|---|---|---|
| 3,936,405 | 2/1976 | Sturni et al. | 523/414 |
| 4,102,863 | 7/1978 | Buchwalter et al. | 525/523 |
| 4,327,200 | 4/1982 | Leitner et al. | 525/531 |
| 4,431,781 | 2/1984 | Paar | 525/502 |
| 4,484,994 | 11/1984 | Jacobs, III et al. | 528/73 |
| 4,758,615 | 7/1988 | Engel et al. | 528/370 |
| 4,758,632 | 7/1988 | Parekh et al. | 525/328.2 |
| 4,806,611 | 2/1989 | Hönel et al. | 528/370 |
| 4,897,435 | 1/1990 | Jacobs, III et al. | 528/99 |
| 4,933,417 | 6/1990 | Yamamoto et al. | 528/69 |
| 4,976,785 | 12/1990 | Nakano et al. | 525/523 |

FOREIGN PATENT DOCUMENTS

| | | |
|---|---|---|
| 0028402 | 10/1980 | European Pat. Off. . |
| 076955 | 9/1982 | European Pat. Off. . |
| 0107088 | 9/1983 | European Pat. Off. . |
| 0107089 | 9/1983 | European Pat. Off. . |
| 0107098 | 9/1983 | European Pat. Off. . |
| 0203204 | 11/1985 | European Pat. Off. . |

Primary Examiner—John Kight, III
Assistant Examiner—Rabon Sergent
Attorney, Agent, or Firm—Bierman & Muserlian

[57] ABSTRACT

Carrier resin for pigment pastes, preparation and use thereof The invention relates to paste resins comprising (a) quaternary ammonium groups, (b) hydroxyl groups, (c) urethane radicals and (d) groups of the formula (I)

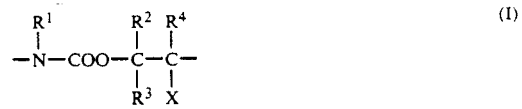

in which $R^1$ to $R^4$ independently of one another represent hydrogen or a hydrocarbon radical of 1 to 10 carbon atoms and X denotes hydroxyl or a urethane radical, the average molecular weight (Mn) of these paste resins being 500 to 10,000.

The invention further relates to the preparation of these paste resins, their use for pigment pastes as well as these pigment pastes. Water-thinnable paints, especially electrocoating paints which comprise the pigment pastes according to the invention, furnish, from a variety of substrates, surfaces free from defects and comparable film thicknesses.

15 Claims, No Drawings

CARRIER RESIN FOR PIGMENT PASTES, PREPARATION AND USE THEREOF

In the paint industry it is generally customary in the manufacture of pigmented paints to grind the pigments in some of the binder intended for use as paint binder or in special binders (paste resins or pigment carrier resins) These so-called grinding pastes (or pigment pastes) are then applied as paint together with the remaining binder. Such grinding pastes are particularly necessary for use with low-solvent electrocoating (EC) paints, since 1. high-pigmented grinding pastes with a low solvent content do not lastingly affect the solvent balance;

2. in the operation of the EC bath it has been found advantageous to carry out the addition of the subsequent materials in two separate components, viz. a high-pigmented colored component and a clearcoat component. Any desired automatic control of the bath operation is thereby considerably facilitated;

3. pigments cannot usually be incorporated directly in an aqueous dispersion or in an EC bath. The reasons for this are many. On the one hand, (inadequately watted) pigments tend to agglomerate in aqueous systems and to form correspondingly inadequate precipitates on the deposited films (in particular on horizontal areas of the workpiece). On the other hand, pigments must be very finely ground ($<10\ \mu m$, preferably $<3\ \mu m$) to be able to form stable pigment dispersions at a corresponding wetting.

The paste resins used for grinding pastes of this type must possess a number of characteristics. An important such characteristic is good wetting power toward the particular pigments. They must furthermore be fully compatible with the principal binder and they must not significantly alter the characteristics of the principal binder when used in the required amounts. In addition, these paste resins should have a relatively low viscosity. Furthermore, even high-pigmented grinding pastes with a pigment/binder ratio (PBR) of $>2:1$ preferably 6:1 and particularly $>12:1$ should have a long shelf life, i.e. the pigments should not sediment or form agglomerates. Nor should the pastes thicken (for example owing to developments of structural viscosity or thixotropy), since in practice they must remain pumpable over an extended period of time. It is furthermore advantageous to employ as special paste resins binders which are depositable under the conditions prevailing in EC. This avoids enrichment of the bath and thus effluent contamination. Also the paste resins deposited in this manner must not be detrimental to film flow-out (for example by cratering) and curing.

AT patent 380,264 describes paste resins which are obtained by targeted modification of low-molecular diepoxide or polyepoxide compounds comprising oxazolidine groups. These systems are distinguished by high pigmentation, but they tend to develop thixotropy and structural viscosity on aging.

EP Offenlegungsschriften 028,402 and 0,076,955 likewise disclose binders bearing oxazolidine groups; however, a PBR of 3:1 cannot be exceeded without agglomeration. US Patent 3,936,405 describes modified epoxy resins bearing onium groups, particularly quaternary ammonium groups as advantageous paste resins. The grinding pastes obtainable therefrom allow PBR of about 4:1 to be reached (Example XI).

EP Offenlegungsschriften 107,088. 107,089 and 107,098 likewise disclose synthetic resins which bear quarternary ammonium groups and can be used as higher pigmentable paste resins (PBR a 20:1). These paste resins have the drawback, inter alia, that different film thicknesses and surface qualities occur on different substrates despite identical deposition conditions.

The substrates particularly used in the automotive industry are blank steel, zinc phosphated steel, hot-galvanized or electro-galvanized steel panels and aluminium. The important criterion being that, apart from defect-free surfaces (for example the L-shaped panel test; no graining; no peaks or spots inter alia), comparable film thicknesses are also achieved. On aluminium in particular, known paste resins tend to form films which are thick and hence often porous.

EP Offenlegungsschrift 203,204 finally describes paste resins which are products of a reaction of aliphatic polyepoxides with polyether amines. Paste resins of this composition have a particularly good antifoam effect. On the other hand, they cannot reach very high and stable degrees of pigmentation (PBR) In addition, the EC dispersions require special anticratering agents where the above binder combinations are used.

It has now been found, surprisingly, that the foregoing drawbacks may be substantially avoided by using paste resins based on modified cyclocarbonate compounds with quaternary ammonium groups.

Accordingly, the invention relates to paste resins comprising (a) quaternary ammonium groups, (b) optionally hydroxyl groups, (c) urethanes of the formula

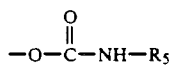

wherein $R_5$ is a hydrocarbon optionally interrupted with —O— and (d) groups of the formula (I)

in which $R^1$ to $R^4$ independently of one another represent hydrogen or a hydrocarbon radical, preferably a (cyclo)-alkyl radical, of 1 to 10 carbon atoms, preferably 1 to 6 carbon atoms, and X denotes hydroxyl or a urethane radical, the average molecular weight ($\overline{M}n$; determined by gel chromatography; PS standard) of these paste resins being 500 to 10,000.

The subject matter of the invention is furthermore a process for the preparation of these paste resins, their use in pigment pastes as well as these pigment pastes.

The paste resins according to the invention preferably have an average molecular weight ($\overline{M}_n$) of 1,000 to 5,000. The hydroxyl values are not more than 10 to 200, preferably 20 to 90 mg of KOH/g and the amount of quaternary nitrogen per gram generally is 0.2 to 20, preferably 0.8 to 5 milliequivalents.

The number of the groups (a) per molecule (statistical average) is generally between 1 to 4, preferably 2 or 3, the number of the groups (b) between 1 and 20, preferably 2 to 8, the number of the groups (c) between 1 to 6, preferably 2 to 4 and the number of the groups (d) between 1 to 6, preferably 2 to 4.

The urethane radicals (c) and X in the formula (I) are derived primarily from the long-chain monoisocyanates (D₁) described in greater detail below, i.e. from monoisocyanates usually of 6 to 22 carbon atoms, preferably 10 to 18 carbon atoms, which from the very beginning contain only one isocyanate group, and/or from diisocyanates or polyisocyanates having one free isocyanate group whose remaining isocyanate group(s) is or are stably masked (i.e. it does not or they do not become demasked on curing) and whose total number of carbon atoms is generally about 10 to 50, preferably 20 to 40. In contrast, the paste resins, especially if they are self-curing, can also contain other isocyanate radicals which are derived from optionally short-chain, partly masked diisocyanates or polyisocyanates (D$_z$), which under the curing conditions lose their masking groups. The term urethane radical is understood to be the group

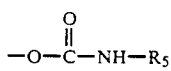

in which R⁵ denotes a hydrocarbon radical particularly of an aliphatic or araliphatic character of 6 to 50, preferably 10 to 40 and particularly 10 to 30 carbon atoms, which radical can be optionally interrupted by heteroatoms (O, NH, NR) or groups such as

In the case of the (partly) masked polyisocyanates, R⁵ also carries one to five, preferably one to three, masked isocyanate groups. In this variant this radical R⁵ can also be aromatic and then has not more than 6 to 25, preferably 6 to 15, carbon atoms.

The preparation of the paste resins according to the invention can be carried out in that polyamines (A) are first reacted with compounds (B) which contain at least one cyclic carbonate group (2-oxo-1,3-dioxolane group) and optionally hydroxyl groups, 1,2-epoxide groups and isocyanate groups, in such a manner that this reaction product (C) still contains quaternizable amino groups, and this reaction product (C) is then quaternized, optionally after a prior reaction with monofunctional isocyanates (D1)/(D2).

The number of carbon atoms in the polyamines (A) is generally 2 to 40, preferably 2 to 20.

In case these polyamines are more than difunctional toward the compounds (B) and the latter contain two cyclic carbonate groups, the reaction conditions should be chosen such that no gelling occurs. Suitable polyamines (A) are preferably those which contain at least one free primary amino group (A1) and also additionally contain secondary and/or tertiary amino groups (A1).

Polyamines (A1) which contain secondary amino functions in addition to the primary amino functions, may be converted to tertiary groups after the reaction with the component (B) and prior to the reaction with the isocyanates, for example with the monoepoxide compounds described in greater detail below (preferably ethylene oxide, propylene oxide, 2-ethylhexyl glycidyl ether, glycidyl versatate); alternatively they may also be reacted with the isocyanates to form urea structures.

Those polyamines are also suitable as polyamines (A), for example, which contain only primary amino groups and preferably are diprimary (A2). These polyamines (A2) are preferably used in admixture with the polyamines (A1), particularly primary/tertiary diamines. In their reaction with an at least difunctional compound (B), the latter act as chain stoppers.

The polyamines (A1)/(A2) may be also represented by the following formula (II)

wherein
p is zero or an integer of 1 to 6, preferably 1 to 4,
R₅ represents a divalent, preferably non-aromatic hydrocarbon radical of 2 to 18 carbon atoms, preferably a branched or straight-chain alkylene radical of 2 to 10 carbon atoms, particularly of 2 to 6 carbon atoms, or a cycloalkylene radical of 5 to 12 carbon atoms, preferably 6 to 10 carbon atoms, or an aralkylene radical of 7 to 12 carbon atoms, preferably 8 to 10 carbon atoms, or a polyoxyalkylene radical of 2 to 18 carbon atoms, and
R₇, R₇' independently of one another represent H or

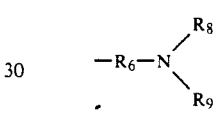

in which R₆ has the same meaning as before, and
R₈, R₉ either independently of one another represent H, (C₁-C₂₀)alkyl, preferably (C₁-C₆)alkyl, hydroxy(C₁-C₁₆)alkyl, preferably

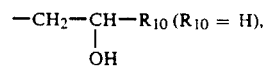

(C₁-C₁₂)alkyl, —CH₂—O—(C₁-C₁₂)alkyl, —CH₂—O—aryl,

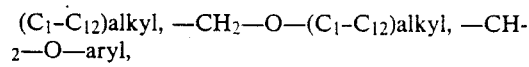

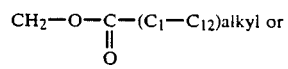

or
R₈ and R₉ are part of a 5-, 6- or 7-membered aliphatic ring, with the proviso that when p is zero, R₇' is not H.

In addition, polyamines of the formula (III)

A—(R₆NH)$_p$—R₆B    (III)

in which A, B = NH₂ or OH, at least one of these two radicals representing NH2 however, and R₆ and p having the same meaning as in the formula (II), are also suitable polyamines.

Furthermore, the polyamines and polyaminopolyols, for example those described in DE patent applications P 36 44 371.9 (HOE 86/F 319), P 37 26 497.4 (HOE 87/F 233) and P 38 09 695.1, are also suitable. These literature sources, including the preferred embodiments described therein, are referred to herewith. In addition, polyaminoamides or condensation products of diprimary amines with dicarboxylic acids (such as adipic acid or dimeric fatty acid) and polyglycol polyamines or amine adducts, such as amine-epoxy resin adducts, are also suitable.

Examples of suitable polyamines (A) are: ethylenediamine, propylenediamine, 2-methylpentamethylenediamine, pentamethylenediamine, hexamethylenediamine, trimethylhexamethylenediamine, neopentyldiamine, octamethylenediamine, triacetonediamine, dioxadecanediamine, dioxadodecanediamine and higher homologs, cycloaliphaticdiamines such as 1,2-, 1,3- or 1,4-cyclohexanediamine; 4,4'-methylene-bis-cyclohexylamine, 4,4-isopro-pylene-biscyclohexylamine, isophoronediamine, tricyclododecenyldiamine, menthanediamine, 4,4,-diamino-3,3,-dimethyldicyclohexylmethane, 3-aminomethyl-1-(3-aminopropyl-1-methyl)-4-methylcyclohexane, N-methylethylenediamine, N-aminoethylpiperazine, 2-aminoethylpiperazine, N,N-dimethylethylenediamine, N,N-dimethylpropylenediamine, N,N-dimethylaminopropylamine, N,N-bisaminopropyl-N',N'-dimethylaminopropylamine, N,N-dihydroxyethylethylenediamine, aromatic amines such as m-xylylenediamine, aliphatic poly(tri-, tetra-)amines such as diethylenetriamine, dipropylenetriamine, bishexamethylenetriamine, triethylenetetramine,tetraethylenepentamine,pentaethylenehexamine, methyliminobispropylamine, N-alkylaminodipropylenetriamine (alkyl=CH$_3$-, CH$_3$-, C$_4$H$_5$-, (CH$_3$)$_2$N-(CH$_2$)$_3$), tetrapropylenepentamine; furthermore alkanolamines such as monoethanolamine, dietnanolamine, aminoethylethanolamine, N-(2-hydroxypropyl)ethylenediamine, mono-, di-(n or iso)propanolamine, ethyleneglycol bis-propylamine, neopentanolamine, methylethanolamine, 2-(2-aminoethoxy)ethanol, hydroxyethylaminoethylamine, hydroxyethyldiethylenetriamine, 3-aminopropyltrialkoxysilane (alkoxy=methoxy, ethoxy, tridecyloxy), 2-amino-2-hydroxymethyl-1,3-propanediol, polyoxypropylenediamine (preferably with an average molecular weight of about 200 to 400), aromatic amines such as (m)-xylylenediamine and the like. Examples of preferred polyamines (A1) which can be used, as can the polyamines (A2), in admixture with one another, are: N,N-bisaminopropyl-N-methylamine, N-aminopropylmethylamine, N-aminopropylpropylamine, tallow fat propylenediamine and especially dimethylaminopropylamine and diethylaminopropylamine. Any materials can be used as the compounds (B), provided they contain on average at least one, preferably two or three cyclic carbonate (2-oxo-1,3-dioxolane) groups per molecule and have no other functional groups which could interfere with the reaction with the component (A). The molecular weight $\overline{M}_n$ (average number, determined by gel chromatography, PS standard) should generally be between 100 and 10,000, preferably between 150 and 3,500 and the 2-oxo-1,3-dioxolane equivalent weight between 100 and 1250. The cyclic carbonate groups are preferably terminal, but in some cases it is also possible to use compounds as components (B) which contain these groups statistically distributed over the molecular chain and which can be prepared by copolymerization using olefinically unsaturated compounds containing these cyclic carbonate groups. DE Offenlegungsschrift 3,644,373, for example, describes such a method of preparation.

The component (B) preferably has the general formula (IV)

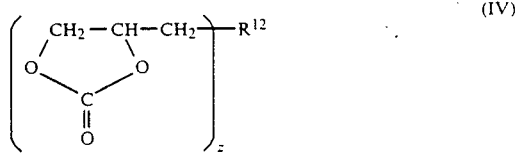

wherein

R$^{12}$ denotes a z-valent radical of a polyether, polyether polyol, polyester, polyester polyol which can also optionally contain (NR$^{13}$) groups, R$^{13}$ representing hydrogen, alkyl of 1 to 14, preferably 1 to 8 carbon atoms or hydroxyalkyl of 1 to 14, preferably 1 to 8 carbon atoms, and these radicals generally having average molecular weights $\overline{M}_n$ of 200 to 5000, preferably 200 to 2000, or a z-valent hydrocarbon radical, preferably an alkylene radical of 2 to 18 carbon atoms which can optionally carry inert or noninterfering groups, or a z-valent poly(sec.)amine radical or the z-valent radical of a reaction product of an epoxide-carbonate compound with polyamines, polyols, polycaprolactone polyols, hydroxyl group-containing polyesters, polyethers, polyglycols, hydroxyl-function-, carboxyl function- and amino function-containing polymeric oils having average molecular weights $\overline{M}_n$ of 800 to 10,000, polycarboxylic acids, hydroxyl function- or amino function-containing polytetrahydrofurans, or of reaction products of polyamines with glycidyl esters of α,α-dialkylalkanemonocarboxylic acids having the empirical formula C$_{12-14}$H$_{22-28}$O$_3$ or with glycidyl versatate, these reaction products generally having average molecular weights $\overline{M}_n$ of 300 to 12,000, preferably 400 to 5000, z denotes 1 to 5.

In this formula (IV) the index z preferably represents 2 or 3, preferably 2.

The term "radical" in the forgoing sense is understood to mean the particular compound (for example polyether) less the active hydrogen atoms of those groups which are adjacent to the CH$_2$ group in the formula (IV).

Compounds of that type and their preparation are described, for example, in DE patent application P 37 26 497.4 (HOE 87/F 233) to which reference is made here.

Preferred starting materials for the preparation of the cyclic carbonates (IV) and the optionally used mixed epoxide-carbonate compounds (V) are the polyglycidyl ethers of polyphenols, for example bisphenol A or bisphenol F. The glycidyl ethers are obtained, for example, by reacting a polyphenol with epichlorohydrin.

Examples of polyphenols are bis(4-hydroxyphenyl)-2,2-propane, bis(4-hydroxyphenyl)methane, 4,4,-dihydroxybenzophenone, bis(4-hydroxyphenyl)-1,1,-ether, bis(4-hydroxyphenyl)-1,1'-isobutane, bis(2-hydroxynaphthyl)methane and 1,5-dihydroxynaphthalene. The polyglycidyl ether of the polyphenol preferably contains free hydroxyl groups additional to the epoxide groups. Diglycidyl adducts of (cyclic) ureas may also be used for this purpose.

In some cases it may be expedient to use as the component (B) additionally or, optionally, on their own mixed epoxide-carbonates, such as those of the general formula (V)

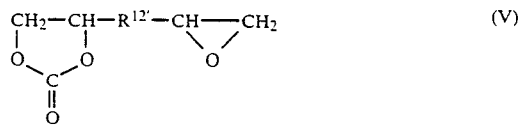

in which $R^{12}$ has the meaning of $CH_2-R^{12}-CH_2$.

Provided that the compounds (B) contain hydroxyl groups, they may already be reacted in this stage partially or completely with the isocyanates (D1)/(D2). This is, however, only then necessary, if the adduct (C), described in greater detail below still contains free primary and/or secondary amino groups suitable for quaternization which otherwise would preferably react with the isocyanate. On the other hand, if the adduct (C) contains only tertiary or masked primary/secondary amino groups, or a sufficient number of tertiary amino groups are available for the quaternization so that the primary/secondary amino groups can react first, the reaction with the isocyanates (D1)/(D2) preferably takes place first in the case of this adduct (C).

To prepare this adduct (C), the components (A) and (B) are reacted in the required stoichiometric ratios or amounts at elevated temperatures, for example at 50° to 140° C., preferably at 50 to 100° C., and in the presence or absence of catalysts and preferably in inert solvents. The reaction is generally allowed to proceed until, for example, a constant or the theoretical amine value is attained. Care must be taken that no gelling occurs. The components (A) and (B) are preferably used in such amounts that 0.8 to 1.5 equivalents of primary amino groups are present per 1 equivalent of cyclic carbonate groups. As an example, a preferred reaction system has the following composition:

(A1) : 28–80, preferably 40–70 mole %;
(A2) : 0–40, preferably 0–30 mole %;
(B) : 20–72, preferably 30–60 mole %.
(The data refer to the solid resins (C))

While in general no catalyst is necessary for the reaction of the primary amino groups of the component (A) with the 2-oxo-1,3-dioxolane groups of the component (B), it is expedient to use a catalyst for the reaction of the less reactive secondary amino groups, provided these are present in the component (A). Suitable catalysts for this purpose are strongly basic compounds such as quaternary ammonium compounds, for example alkyl-, aryl-, and/or benzylammonium hydroxides and alkyl-, aryl- and/or benzylammonium carbonates. Specific representatives of quaternary ammonium compounds are in this connection alkylbenzyldimethylammonium hydroxide (alkyl=$C_{16}$-$C_{22}$), benzyltrimethylammonium hydroxide and tetrabutylammonium hydroxide.

Preferred catalysts are strongly basic amines, for example diazabicyclooctane (DABCO), guanidine etc. In addition, the so-called supranucleophilic catalysts, for example 4-pyrrolidinepyridine and poly(N,N-dialkylaminopyridine) are also suitable for this purpose; cf. the article by R. A. Vaidya et al. in Polymer Preprints, Vol 2 (1986), pp. 101-102.

Suitable solvents for the above reaction are preferably aprotic and, optionally, polar solvents. Examples of these are: halogenated hydrocarbons (less suitable for use in dip paints), N-methylpyrrolidone, ethers such as diethyl ether, 1,2-dimethoxyethane, tetrahydrofuran or dimethyl diglycol, dioxane; ketones, for example acetone, methyl ethyl ketone, methyl isopropyl ketone, methyl isobutyl ketone, cyclohexanone and the like; esters (less suitable for use in dip paints), such as butyl acetate, ethylglycol acetate and methoxypropyl acetate; (cyclo)aliphatic and/or aromatic hydrocarbons such as hexane, heptane, cyclohexane, benzene, toluene, the various xylenes as well as aromatic solvents boiling in the range of about 150 to 180° C. (higher-boiling mineral oil fractions such as Solvesso ®). The solvents may be used singly or mixed.

The stoichiometric evaluation of the starting products and the evaluation of the reaction products as to the progress of the reaction are based in the case of the component (A) on the amine value, usually determined by perchloric acid titration, and in the case of the component (B) on the cyclocarbonate equivalents value, usually determined by titration with potassium hydroxide solution. Regarding further details of the preparation, reference should be made to the DE patent application P 37 26 497.4 (HOE 87/F 233), already mentioned, and to EP Offenlegungsschrift 234,395 (HOE 87/F 159J).

Compounds based on reaction products of amines and cyclic carbonates according to the patent applications mentioned above as well as DE Offenlegungsschrift 3,644,370 (HOE 86/F 318) are basically also suitable as the adducts (C) for the present invention, provided that they fall within the molecular weight range according to this invention and contain a sufficient number of quaternizable amino groups.

The reaction of the adduct (C) with the isocyanates (D1)/(D2) takes place under conditions which are customary for these types of reaction, expediently at 30 to 80° C. and in the presence of inert, preferably aprotic solvents, for example those described above. The reaction is terminated when an NCO content of <0.2 % is reached.

The maximum number of the equivalents of isocyanate used is expediently governed by the following criterion:

| | |
|---|---|
| n(B) | = hydroxyl functionality of the component (B) per mole; |
| n(A + B) | = hydroxyl functionality which is formed per mole of (C) according to the reaction (A) + (B); |
| n(D) | = equivalents of isocyanate (from D1 and D2) per mole of (C); |
| n(D) | = n(B) + n (A + B); |
| (D1): | 0–4 equivalents per mole of compound (C), preferably 1–2; |
| (D2): | 0–4 equivalents/mole of compound (C), preferably 0–2. |

The long-chain monoisocyanates (D1) which are intended to impart to the compounds according to the invention, above all, an adequate measure of a lyophilic character in addition to a degree of flexibility, usually have 6 to 22 carbon atoms, preferably 10 to 18 carbon atoms; their hydrocarbon radical preferably possesses an aliphatic or aralipathic character. Appropriate examples are octadecyl isocyanate, dodecyl isocyanate, nonylphenyl isocyanate etc.

Partly masked polyisocyanates still having one free NCO group and a total number of carbon atoms of 10 to 50, preferably 20 to 40, are also a possible alternative.

For example, the compounds listed below at (D2) may be used as polyisocyanates, preferably diisocyanates. Correspondingly, longer-chain compounds which are normally not split off during the curing of the paint film, are suitable for masking. Examples of these are fatty amines such as tallow fatty amine, octadecylamine or dodecylamine, nonylamine, isononyloxypropylamine or the correspondingly derived alcohols, for example octadecyl alcohol, hexyl glycol and the like. Special polyether alcohols, for example the ethoxylated octyl and nonyl phenols, known as wetting agents (for example Triton-X ®or Arkopal-N ®), may be also used.

If the paste resins according to the invention are self-curing, then the reaction product (C) or even the component (B) may be also reacted with the partly masked isocyanates (D2) which may also have a shorter chain and may become demasked under the curing conditions.

Any polyisocyanates known in the polyurethane or paint sector, for example aliphatic, cycloaliphatic or aromatic polyisocyanates, are suitable polyisocyanates for this purpose. Typical examples of such polyisocyanates are:

Xylylene diisocyanate, diphenylmethane-4,4-diisocyanate, triphenylmethyl-4,4'-triisocyanate, triphenylmethane triisocyanate, polyphenyl polymethylisocyanate, 2,2,4(2,4,4)-methylcyclohexyl diisocyanate, dicyclohexylmethyl diisocyanate, diethylfumarhexyl isocyanate, bis(3-methyl-4-isocyanatocyclohexyl)methane, 2,2-bis(4-isocyanatecyclohexyl)propane, the methyl ester of the lysine diisocyanate, the biuret of the hexamethylene diisocyanate, diisocyanates of dimeric acids, 1-methylbenzene-2,4,5-triisocyanate, biphenyl-2,4,4'-trisocyanate, the triisocyanate obtained from 3 mole of hexamethylene diisocyanate and 1 mole of water having a 16% NCO content, and other compounds containing at least two NCO groups per molecule, preferably isophorone diisocyanate, hexamethylene diisocyanate, trimethylhexamethylene diisocyanate and tetramethylhexamethylene diisocyanate, but in particular 2,4-tolylene diisocyanate or 2,6-toluylene diisocyanate or mixtures of these compounds.

In addition to these simple polyisocyanates, those isocyanates are also suitable which contain heteroatoms in the radical linking the isocyanate groups. Examples of these are polyisocyanates which comprise carbodiimide groups, allophonate groups, isocyanurate groups, urethane groups, acylated urea groups or biuret groups.

Finally, suitable polyisocyanates are also the known prepolymers containing terminal isocyanate groups, available in particular by the reaction of the simple polyisocyanates mentioned above, especially diisocyanates, with excesses of organic compounds having at least two groups reactive toward isocyanate groups. These prepolymers, however, are preferably used as external curing components in non-self-curing systems.

The masking agents should be such that at the customary curing temperatures of 130° to 180° C., in the presence or absence of catalysts known for this purpose, they again split off. Examples of such masking agents are: aliphatic, cycloaliphatic or alkylaromatic (monohydric) alcohols, for example lower aliphatic alcohols such as methyl and ethyl alcohol, the various propyl, butyl and hexyl alcohols, heptyl, octyl, nonyl and decyl alcohol and the like; methoxy-1-propanol and methoxy-2-propanol; also unsaturated alcohols such as allyl alcohol, propargyl alcohol, cycloaliphatic alcohols such as cyclopentanol, cyclohexanol, alkylaromatic alcohols such as benzyl alcohol, methylbenzyl alcohol, p-methoxybenzyl alcohol and p-nitrobenzyl alchol and monoethers of glycols, such as ethylene glycol monoethyl ether, ethylene glycol monobutyl ether and the like. Further masking agents are ketoximes, expediently those of 3 to 20 carbon atoms, preferably 3 to 10 carbon atoms, such as acetoxime, methyl ethyl ketoxime (=butanoxime), hexanoxime (such as methyl butyl ketoxime), heptanoxime (such as methyl n-amyl ketoxime), octanoxime and cyclohexanoxime, (CH-acid compounds such as alkyl malonates, acetoacetic esters such as cyanoacetic esters having in each case 1 to 4 carbon atoms in the ester group, NH-acid compounds such as caprolactam, amino alcohols such as diethylethanolamine, and special amines such as dibutylamine. 2-Ethylhexanol, butyl diglycol, butyl glycol and 3-methyl-3-methoxybutanol are preferred.

Examples of suitable demasking catalysts are lead octoate, lead silicate, lead naphthenate, zinc compounds according to the DE Offenlegungsschriften 2,807,698 and 3,306,064, zinc compounds and zinc-lead compounds of nitrophthalic acid, complex compounds obtained from zinc oxide and 8-hydroxyquinoline (also usable in situ), antimony trioxide, manganese (II) and manganese (III) acetlyacetonate, manganese phosphate, manganese-zinc phosphate, cobalt naphthenate, cadmium acetylacetonate, thallium dicyclopentadiene, triethanolamine titanate or organic compounds of tin, for example dibutyltin dilaurate and preferably dibutyltin oxide.

The urethane group-containing products (C) obtained in this manner can basically be quaternized by any methods known for this purpose, such as those, for example, described in DE Offenlegungsschrift 2,641,286. However, the nature of the counterions introduced may lead to limitations. Thus, quaternizing methods for paste resins according to the invention to be used in electrocoating paints cannot be employed if they introduce halogen anions, since these lead to pronounced anode corrosion. This is true, for example, in the case of quaternization using alkyl halides (iodides), but not, however, when using dialkyl sulfates or trialkyl phosphates.

This quaternization is preferably carried out by reacting (C) with monoepoxide compounds, for example ethylene oxide, propylene oxide, 2-ethylhexyl glycidyl ether, glycidyl versatate, glycidyl phthalimide, phenyl glycidyl ether, methylglycidyl ether, phenol-(EQ)$_5$ glycidyl ether in the presence of preferably organic acids and preferably 0.5 to 20 mole of H$_2$O per mole of amino group (cf. in this connection also Houben-Weyl, vol. XI/2, p. 609 ff (1958)).

The acids used have a pK$_a$ value of $\leq 6$ and are expediently well miscible with water. Examples of these are inorganic acids such as phosphoric acid; however, organic acids, such as formic acid, acetic acid and in particular lactic acid, are preferred. It is also possible, for example, to carry out first the reaction of (C) with the monoepoxide compound- under neutral conditions and only add the acid subsequently.

Quaternization is generally carried out at temperatures of 20° to 100° C., preferably 50° to 100° C., advantageously in the presence of an organic solvent. In a preferred embodiment, for example, a mixture of 1 mole of lactic acid/mole of the amino group to be quaternized and 0.5 to 20, preferably 2 to 10 mole of demineralized water/mole of the amino group to be quaternized is slowly added to a mixture of the reaction product (C)

and the monoepoxide compound (1 mole per mole of tertiary amino groups or 2 mole per mole of secondary amino groups), in a protic solvent, preferably butyl glycol, methoxypropanol and/or ethoxypropanol. The reaction is carried out until an acid value of <10 is reached.

In the case of readily volatile epoxide compounds, the mixture of lactic acid, water and solvent is first added and the epoxide compound (ethylene oxide, propylene oxide etc.) is introduced subsequently (pressureproof apparatus) with occasional cooling.

The compounds quaternized in this manner are highly suitable for use as paste resins for pigment pastes and pigment dispersions, pigment:paste resin ratios of 1:1 to 40:1, preferably 12:1 to 20:1 being possible, depending on the type of pigment, its primary particle size etc. Apart from the paste resin according to the invention and the pigment, these pigment pastes may also contain the customary additives, such as fillers, other auxiliary substances commonly added to paints (dispersants, wetting agents, solvents, plasticizers, antifoams, etc.) as well as, optionally, a part or all of the known curing catalysts.

Suitable pigments are those commonly used for this purpose, for example titanium oxide (usually the main component), other white pigments and extenders, such as antimony oxide, zinc oxide, basic lead carbonate or lead silicate and/or lead sulfate, barium carbonate, clay, calcium carbonate, aluminum silicate, silica, magnesium carbonate and/or magnesium silicate; furthermore (addition) colored pigments such as phthalocyanin blue, hydrated iron oxides, chrome yellow, carbon black, toluidine red and manganese dioxide.

The water content of such pigment pastes depends on the viscosity desired for the processing and usually is between 10 and 50%.

If convenient, the pigment paste may also be further diluted prior to use.

The preparation of such pigment pastes is carried out in a known manner, such as that described in DE patent application P 37 26 497.4 (HOE 87/F 233) or in the DE Offenlegungsschrift 2,634,229.

Comminution of the pigment is usually performed in ball mills, sand mills, Cowles dissolvers or continuous trituration equipment, until the pigment has been reduced to the desired particle size; it is then wetted by the carrier resin or dispersed in it. After the comminution the particle size of the pigment should be in the region of 10 micrometers or less, preferably as small as possible. The pigment is generally reduced to a fineness of less than 3 μm (measured by laser aerosol spectroscopy), preferably in the presence of glass beads, $Al_2O_3$ (corundum) beads, ceramic beads or $ZrO_2$ beads (diameter 0.5–3 mm).

The foregoing pigment dispersions (pigment pastes) are then added with mixing in the usual manner and in sufficient amounts to the water-thinnable paint, in particular electrocoating paint. The finished, electrically depositable composition generally has a pigment to binder (=electrically depositable resin plus paste resin) ratio of 0.05:1 to 0.8:1.

Suitable film-forming resins for these paints are the products known for this purpose, such as those described, for example, in DE patent applications P 36 44 371.9, P 37 26 497.4 and P 38 09 655.1 as well as in EP Offenlegungsschrift 234 395. Other resins suitable for this purpose are disclosed in Journal of Coatings Technology, vol. 54, No. 686, (1982), pp. 33 to 41 ("Polymer Compositions for Cationic Electrodepositable Coatings"), to which reference is also made.

The electrical deposition of the paint particles from the electrocoating paints is carried out by known methods to which reference is made here. The deposition can take place on all electrically conducting substrates, for example metals such as steel, copper, aluminum and the like.

After deposition, the coating is cured by usual processes at elevated temperatures which generally depend on the nature of the curing components, temperatures of 100 to 220° C., preferably 130 to 180° C., being used.

The resulting coatings are distinguished particularly by an outstanding resistance to salt spray (ASTM-B-117-64; 960 hours on zinc phosphated and blank steel panel).

Owing to the conversion of the quaternary ammonium structure into a tertiary amine, on baking, the paste resins according to the invention furnish no cleavage products which lead to chain termination. A reduction of the polarity of the paint film with its consequent increase in water resistance is also linked to this conversion.

EXAMPLES

All indications of quantities are in parts by weight.

The sieve residue and the L-shaped panel coating are determined or performed as follows:

Sieve residue 1 liter of the diluted paint solution is poured through a weighed perlon sieve (mesh size 30 μm). The sieve is rinsed with deionized water and weighed after drying (1 h/125° C.). The result is reported in mg of residue (based on 1000 ml of the bath).

L-shaped panel coating

A zinc phosphated steel panel (about 10 x 20 cm) is bent at a right angle at its lower end (a 3 cm horizontal area). The panel is immersed in the coating bath in such a manner that the horizontal arm of the L is about 15 cm below the surface of the paint bath. The coating is carried out with the mixing action switched off and with a coating time of 4 minutes. At the end of the coating period the panel remains in the bath for a further 2 minutes. The panel is subsequently withdrawn from the bath, after a further 2 minutes rinsed with water and baked. The panel is visually assessed for flow-out, luster and sedimentation phenomena.

I. Preparation of the paste resin according to the invention

1.) Partly masked polyisocyanate (D2) 124 parts (1.05 equivalents of OH) of butyl glycol are slowly added to 174 parts of toluylene diisocyanate (2 equivalents of NCO, 80% of the 2,5-isomer, 20% of the 2,6-isomer) at 25 to 40° C. in the presence of 0.01% of triethylamine as catalyst and the reaction is allowed to proceed until an NCO value of about 13.5 to 14.0% is reached.

2.) Synthesis of the compound (C)

2.1.) 204 parts of N,N-dimethylaminopropylamine (2 mole, 2 equivalents of primary amine) were added at about 60° C. to 1048 parts of a biscarbonate based on Epicote ® 1001 (1 mole, 2 equivalents of carbonate) in 537 parts of N-methylpyrrolidone in the course of one hour. The reaction mixture was then kept at this temperature for about 3 to 5 hours (amine value about 94/solid binder). The 70% resin mixture could then be further processed.

2.2.) A mixture consisting of 204 parts of N,N-dimethylaminopropylamine (2 mole, 2 equivalents of primary amine) and 176 parts of 4,7-dioxadecane-1,10-diamine (1 mole, 2 equivalents of primary amine) was added at about 60° C. to 920 parts of a biscarbonate based on Epicote ® 828 (2 mole, 4 equivalents of carbonate) in 557 parts of N-methylpyrrolidone in the course of 1 hour. The reaction mixture was then kept at this temperature for about 3 to 5 hours (amine value about 90/solid binder). The 70% resin mixture could then be further processed.

3.) Reaction of the compound (C) with isocyanate (D1)/(D2)

x parts of the octadecyl isocyanate (D1) and y parts of the partly masked isocyanate (D2) in accordance with example 1) were added at 60 to 70° C. to the reaction mixtures obtained above in 2.) in the course of one hour in accordance with the Table 1 below. The reaction mixture was then kept at this temperature until an NCO value of virtually 0% was reached.

TABLE 1

| Example | 3.1 | 3.2 | 3.3 |
|---|---|---|---|
| Initial compound according to example: | 2.1. | 2.1. | 2.1. |
| x parts of octadecyl isocyanate | 590 | 590 | 590 |
| (mole/equivalents of NCO) | (2/2) | (2/2) | (2/2) |
| y parts of isocyanate according to example 1 | — | 596 | 596 |
| (mole/equivalents of NCO) | — | (2/1.9) | (2/1.9) |
| Amine value (solid binder) | 62 | 47 | 45 |
| Solids content (in %; 1 h, 125° C.) | 78 | 82 | 82 |
| nA | 2-2.5 | 2-2.5 | — |
| n(A + B) | 2 | 2 | 4 |

4.) Quaternization

The binder preliminary stages obtained in 3.) (for amounts see Table 2 below) were introduced in a reaction vessel set to an overpressure of at least 10 bar in an atmosphere of nitrogen. A mixture consisting of 102.2 parts of 90% lactic acid (2 mole), 26 parts of demineralized water (a total of 2 mole) and x parts of butyl glycol were then added in the course of 20 minutes at 50° C. with occasional cooling. 10 parts of ethylene oxide (0.228 mole) and nitrogen were passed into this thoroughly homogenized mixture. This caused the temperature to rise; it was kept at 100 to 120° C. with occasional cooling. The reaction mixture was subsequently cooled to 70 to 80° C. and the remaining amount of ethylene oxide (about 166 parts; 3.772 mole) was passed in the course of 2 hours.

The reaction was terminated when an acid value of about 10 to virtually zero was reached (some further 2 to 4 hours). The excess ethylene oxide was then distilled off, the solids content was subsequently adjusted using y parts of demineralized water and the mixture was cooled.

TABLE 2

| Example | 4.1 | 4.2 | 4.3 |
|---|---|---|---|
| Initial compound according to example: | 3.1. | 3.2. | 3.3. |
| Parts by weight | 2379 | 2975 | 2943 |
| Parts of butyl glycol | 107 | 306 | 268 |
| Parts of demineralized water | 56 | 112 | 208 |
| Solids content (in %; 1 h, 125° C.) | 70 | 70 | 70 |
| Viscosity (DIN 53 019) | 310 | 280 | 320 |

TABLE 2-continued

| Example | 4.1 | 4.2 | 4.3 |
|---|---|---|---|
| mPa·s at 100 s⁻¹, 20° C. | | no thixotropy | |

All binders were water-miscible to an unlimited degree.

5. Comparison experiment

For the comparison experiment, a pigment paste resin whose synthesis is described in EP Offenlegungsschrift 107,098 (Example II), was synthesized.

235 parts (2.3 equivalents) of dimethylaminopropylamine were added in the course of ½ hour to 420 parts (2 equivalents) of coconut fatty acid at room temperature. This caused the temperature to rise to about 70° C. The reaction mixture was then refluxed at 135 to 140° C. for about 2 hours.

The water of reaction was then distilled off using a water separator and excess amine was finally removed in vacuo. The reaction product was then cooled to room temperature, diluted with 237 parts of butyl glycol, thoroughly homogenized and then treated with 218 parts of 90% lactic acid (2.18 equivalents). This caused the temperature to rise to about 60° C. and the temperature was kept at this level for about 15 minutes. 208 parts of demineralized water were then added, the reaction mixture was thoroughly homogenized at 60° C. for 15 minutes and then 439 parts (2.34 equivalents) of Epikote 828 were rapidly added. The reaction mixture was then heated to 75 to 85° C. and kept at this temperature for 2 hours. The product had an acid value of about 10 mg of KOH/g of solid resin and a solids content (1 h, 125° C.) of about 62%. The binder was water-miscible to an unlimited degree.

6. Test of the binders prepared according to the invention as pigment paste resins:

a) Pigment pastes were prepared by standard test procedures from the binders corresponding to the Examples 4.1., 4.2., 4.3., and the comparison experiment 5 in accordance with the formulation below.

| Pigment composition (including additives) | | | |
|---|---|---|---|
| A | | | B |
| 3.550 | (a) | Surfynol ® 104(50%) in butyl glycol | 3.550 |
| 10.542 | (b) | basic lead silicate paste (75%) in demineralized water (EP 202) | 10.542 |
| 1.692 | (c) | Printex ® 25 (carbon black pigment) | 1.480 |
| 5.086 | | dibutyltin oxide | 14.834 |
| 79.130 | (d) | titanium oxide RSE 50 | 69.594 | a) From Air Products and Chemicals Inc. (USA)
b) from Heubach
c) From Degussa AG
d) From Bayer AG

| | Pigment pastes: | | | |
|---|---|---|---|---|
| Example | Paste resin according to | Pigment composition | PBR | Solids content (1 h, 125° C.) |
| 6.1. | 4.1 | A | 12:1 | 70% |
| 6.2. | 4.2 | A | 12:1 | 70% |
| 6.3. | 4.3 | A | 12:1 | 68% |
| 6.4. | 5 (comp.) | A | 12:1 | 80% |

-continued

Pigment pastes:

| Example | Paste resin according to | Pigment composition | PBR | Solids content (1 h. 125° C.) |
|---|---|---|---|---|
| 6.5. | 5 (comp.) | B | 35:1 | 70% |

The paste resins were ground according to the above recipe in a ball mill by a method known to a person skilled in the art (see also DE patent application P 3 726 497.4) and the solids content was then adjusted using demineralized water in order to ensure appropriate ease of handling.

Virtually none of the pastes were thixotropic; their viscosities at $D=50$ s$^{-1}$ were 300 to 450 mPa.s and at $D=100$ s.: 150 to 250 mPa.s. The pastes exhibited n significant viscosity changes or pigment drying even on storage (4 weeks at room temperature).

b) The pastes were then added with stirring to a dilute clearcoat (20% aqueous solution) based on the EC binder dispersions described below under II and their solids content was adjusted to 18% (1 h, 125° C.) with demineralized water. The sieve residue was then determined at intervals of 24 hours, 14 days and 4 weeks (stirring at room temperature) and an L-shaped panel coating test was carried out. The composition of the test paints and the subsequent results are summarized in Table 4 further below.

II. Preparation of the binder dispersions (EC paints)

1. Synthesis of the curing agents (by analogy with DE patent application P 38 09 695.1)

102.3 parts (0.55 mole) of Beckopox ®-080 (2-ethylhexyl glycidyl ether) were added to 129.3 parts (0.55 mole) of DETA(EO)₃ [DETA(EO)₃=triply ethoxylated diethylenetriamine as described in the above patent application] in 116.80 parts of N-methylpyrrolidone in the course of 30 minutes at 60° C. The temperature rose to 80° C. and the reaction mixture was kept at 100° C. (about 3 hours) until an epoxide value of about 0 was reached. The reaction mixture was then diluted with 449 parts of toluene and cooled to 60° C. 819.5 parts (2.75 mole) of the partly masked polyisocyanate according to I 1.) were added to this mixture in the course of 30 minutes and the reaction was then allowed to proceed for 4 hours at 70° C. until an NCO value of 0.15% was reached.

The amine value of the resultant curing agent was about 57.5 mg of KOH/g.

Solids content (1 h, 125° C.) 65%

2. Preparation of the binder 2.1. By a method based on Example VIII/26 of DE Offenlegungsschrift 3,624,454, a binder solution was prepared as follows:

832 parts of the monocarbonate of Epicote ® 828 (diglycidyl ether) of bisphenol A; 2 equivalents of epoxide), 830 parts of Capa ® 205 (=polycaprolactonediol with an average molecular mass of 830) and 712 parts of toluene were mixed and caused to react at 70° to 140° C. in the presence of about 0.3% of boron trifluorodietherate until an epoxide value of about 0 was reached. 1497 parts of the biscarbonate of Epicote ® 1001 (2 equivalents of carbonate, 70% suspension in toluene) were then added, the mixture was thoroughly homogenized and treated at 60 to 80° C. with 1192 parts of the compound according to Example I.1 in the course of 2 hours. The temperature was then kept at 80° C. until an NCO value of about 0% was reached.

The reaction mixture was then cooled to about 40° C., 645 parts of bishexamethylenetriamine were added, followed by a further 596 parts of the compound I.1. added at 30 to 40° C. in the course of 2 to 3 hours; the reaction was then allowed to proceed at 40° C. until an NCO value of ≦0.1% was reached.

The binder mixture obtained in this manner was adjusted to a 66% solids content using 1490 parts of methoxypropanol, heated to about 70° C. and kept at this temperature until an amine value of about 33 (based on solid binder) was reached. The reaction mixture was subsequently partly neutralized to an MEQ value of about 30 using 142 parts of 50% formic acid (solids content 65%, 1 hour, 125° C.).

2.2 By analogy with EP Offenlegungsschrift 12,463 and DE Offenlegungsschrift 3,615,810:

301 parts of diethanolamine, 189 parts of N,N-dimethylaminopropylamine and 1147 parts of an adduct obtained from 2 mole of 2-methylpentamethylenediamine and 4 mole of glycidyl versatate (Cardura ® E 10 from Shell) were added to 5273 parts of bisphenol-A epoxy resin (epoxide equivalent weight 475) in 3000 parts of ethoxypropanol. The reaction mixture was kept at 60° to 90° C. with stirring for 4 hours and then at 120° C. for 1 hour. It was then diluted (about 720 g) with ethoxypropanol to a 65% solids content.

| | |
|---|---|
| Hydroxyl value | 276 mg of KOH/g of solid resin |
| Hydroxyl value (primary OH) | 55 mg of KOH/g of solid resin |
| Hydrogenation iodine value | virtually zero |
| Amine value (tertiary amino groups) | 78 mg of KOH/g of solid resin |

3. Preparation of the paints:

The following dispersions (40%; 1 h, 125° C.) were prepared from the binders described in II 2. by the recipe given below:

TABLE 3

| Dispersion I | Dispersion II |
|---|---|
| 588 parts of binder 2.1. (65% in toluene/methoxypropanol) | 1032 parts of binder 2.2. (65% in ethoxypropanol) |
| 588 parts of binder 2.2. (65% in ethoxypropanol) | |
| 363 parts of curing agent 1. (65% in NMP/toluene) | 506 parts of curing agent 1. (65% in NMP/toluene) |
| 20 parts of butyl diglycol | 20 parts of butyl diglycol |
| 17.06 parts of 50% formic acid | 32.2 parts of 50% formic acid |
| 1381 parts of demineralized water | 1389 parts of demineralized water |

NMP = N-methylpyrrolidone

The binder, the curing agent, the butyl diglycol and the formic acid were taken, thoroughly homogenized and then 457 g (I) and 463 g (II) respectively of solvent were removed by vacuum distillation at temperatures of 40 to 80° C. (jacket temperature) and a minimum pressure of 0.02 bar in 50 minutes. To avoid foaming, the pressure was reduced appropriately slowly. At the end of the distillation atmospheric pressure was restored and the mixture was dispersed with warm demineralized water at 60° C. with efficient stirring to a solids content of 40% by weight (determined at 125° C./1 h). The resultant low-viscosity dispersions were filtered at 40° C. through a 25 μm GAF filter. The MEQ values were about 30 (I) and 35 (II) respectively.

The test combinations 1 to 10 were subjected to cataphoretic deposition in an open glass vessel. The indicated substrates were the cathode and a blank steel panel, at a distance of 5 to 10 cm from the cathode, was the anode. The temperature of the bath was about 28° C., deposition took 2 minutes.

The assessment of the surfaces was carried out on cured films (baking conditions: 20 minutes, object temperature 180° C.) with a theoretical film thickness of 2μm on B1. The results are summarized in Table 4 below:

TABLE 4

| Test combination | Clearcoat dispersion | Pigment paste | PBR of the paint | Sieve residue after | | | L-shaped panel test after | | | Coating on | | | |
|---|---|---|---|---|---|---|---|---|---|---|---|---|---|
| | | | | 24 hours | 14 days | 4 weeks | 24 hours | 14 days | 4 weeks | A1 | B1 | B2 | B3 |
| 1 | I | 6.1. | 0.4:1 | 10 | 30 | 80 | pass | pass | pass | pass | pass | pass | pass |
| 2 | I | 6.2. | 0.4:1 | 10 | 25 | 60 | pass | pass | SM | pass | pass | pass | pass |
| 3 | I | 6.3. | 0.4:1 | 20 | 40 | 100 | pass | pass | M | M | pass | M | P |
| 4 | I | 6.4. (comp.) | 0.4:1 | 5 | 30 | 180 | pass | SM | M | M,P | pass | pass | D |
| 5 | I | 6.5. | 0.4:1 | 80 | 150 | 200 | pass | fail | fail | B,O | P | pass | B,E |
| 6 | II | 6.1. | 0.4:1 | 20 | 20 | 50 | pass | pass | pass | pass | pass | pass | pass |
| 7 | II | 6.2. | 0.4:1 | 30 | 30 | 40 | pass | pass | pass | pass | pass | pass | pass |
| 8 | II | 6.3. | 0.4:1 | 30 | 50 | 50 | pass | SM | S | M | pass | pass | M |
| 9 | II | 6.4. (comp.) | 0.4:1 | 20 | 20 | 140 | pass | pass | SM | P,O | pass | P | P |
| 10 | II | 6.5. | 0.4:1 | 50 | 100 | 250 | SM | S | fail | B,P | pass | P | P,E |

The abbreviations in Table 4 have the following meaning:

| pass | coating satisfactory, no sedimentation phenomena |
|---|---|
| SM | slight matting |
| M | matt film, still no process interference |
| S | distinct sedimentation phenomena |
| fail | film unusable |
| A1 | aluminum |
| B1 | Bonder 132 |
| B2 | Bonder 26 |
| B3 | Bonder 26 - galvanized |
| PBR | pigment/binder ratio |
| P | peaks |
| C | craters |
| D | depressions |
| O | overcoating |
| B | coating break-up |
| E | edge crawling |

The coating on the various substrates (A1 B1, B2, B3) was carried out under identical deposition conditions and should not show any differences ($\Delta \geq 2$ μm) in the film thickness (about 20 μm). Flow-out, edge covering and matting of the film must also be satisfactory.

It can seen from Table 4 that the pigment pastes according to the invention satisfy the requirements regarding stability and coating behavior. The experiments carried out with the comparison pastes indicate (especially 6.5) that the pastes are less satisfactory in respect of sieve residue and L-shaped panel test and that the high pigment-binder ratios tend to have an adverse effect (PRB about 35:1).

What is claimed is:

1. Paste resins comprising (a) quaternary ammonium groups, (b) optionally hydroxyl groups, (c) optionally urethanes of the formula $$-O-\overset{O}{\underset{\|}{C}}-NHR_5,$$

wherein $R_5$ is a hydrocarbon optionally interrupted with —O—, and (d) groups of the formula (I)

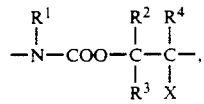

in which $R^1$ to $R^4$ independently of one another represent hydrogen or a hydrocarbon radical of 1 to 10 carbon atoms, and X denotes hydroxyl or an urethane of the formula

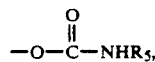

the average molecular weight (Mn) of these paste resins (Mn) of these paste resins being 500 to 10,000.

2. The paste resins as claimed in claim 1, wherein these paste resins contain on average 1 to 4 of the groups (a) and 1 to 6 of the groups (d) per molecule.

3. The paste resins as claimed in claim 1, wherein the number of the groups (b) is on average 1 to 20 per molecule.

4. The paste resins as claimed in claim 1, wherein the number of the groups (c) in the molecule is about 1 to 6 per molecule.

5. The paste resins as claimed in claim 1, wherein the urethane radicals (c) and X in the formula (I) are derived from monoisocyanates of 6 to 22 carbon atoms or from partly masked polyisocyanates of a total number of carbon atoms of 10 to 50.

6. The paste resins as claimed in claim 1, wherein the average molecular weight ($\overline{M}n$) is 1000 to 5000.

7. The paste resins as claimed in claim 1, which have hydroxyl values of 10 to 200 mg of KOH/g.

8. The paste resins as claimed in claim 1, wherein the amount of quaternary nitrogen is 0.2 to 20 milliequivalents per gram.

9. The paste resins as claimed in claim 1, which are self-curing.

10. A process for the preparation of the paste resins as claimed in claim 1, wherein polyamines (A) are first reacted with compounds (B) which contain at least one cyclic carbonate group and, optionally, hydroxyl groups, 1,2-epoxide groups and isocyanate groups, in such a manner that this reaction product (C) still contains quaternizable amino groups, and this reaction product (C) is then quaternized, optionally after a prior reaction with monoisocyanates of 6 to 22 carbon atoms or with partly masked polyisocyanates still having one free NCO group.

11. The process as claimed in claim 10, wherein at least one diamine from the group of diprimary diamines ($A_2$) and diamines ($A_1$) which contain a secondary or tertiary amino group in addition to a primary amino group, is used as the polyamine (A).

12. The process as claimed in claim 10, wherein as the compounds (B) compounds of the formula (IV)

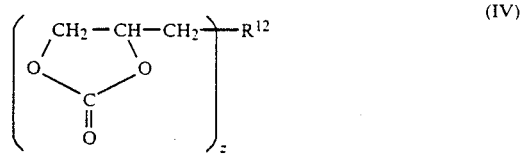

are used, in which
denotes a z-valent radical of a polyether, polyether polyol, polyester, polyester polyol, which can also optionally contain ($NR^{13}$) groups, $R^{15}$ representing hydrogen, alkyl of 1 to 14 carbon atoms or hydroxyalkyl of 1 to 14 carbon atoms, or denotes a z-valent hydrocarbon radical, preferably an alkylene radical of 2 to 18 carbon atoms which can optionally also carry inert or non-interfering groups, or denotes a z-valent poly(sec.)amine radical or denotes the z-valent radical of a reaction product of an epoxide-carbonate compound with polyamines, polyols, polycaprolactone polyols, hydroxyl group-containing polyesters, polyethers, polyglycols, hydroxyl function-containing, carboxyl function-containing and amino function-containing polymeric oils having average molecular weights of 800 to 10,000, polycarboxylic acids, hydroxyl function-containing or amino function-containing polytetrahydrofurans and reaction products of polyamines with glycidyl esters of $\alpha,\alpha$-dialkylalkanemonocarboxylic acids of the empirical formula $C_{12-14}H_{22-26}O_3$ or with glycidyl versatate, denotes 1 to 5.

13. The process as claimed in claim 10, wherein ($A_1$), ($A_2$) and (B) are used in amounts of 28 to 80 mole %, 0 to 40 mole % and 20 to 60 mole %.

14. The process as claimed in claim 10, wherein the quaternization is carried out by a reaction of (C) with a monoepoxide in an acid medium.

15. Pigment pastes comprising the paste resins according to at least claim 1 and a pigment dispersed therein.

* * * * *

UNITED STATES PATENT AND TRADEMARK OFFICE
CERTIFICATE OF CORRECTION

PATENT NO. : 5,055,542

DATED : Oct. 8, 1991

INVENTOR(S) : Michael Hönel; Peter Ziegler; Walter Sprenger and Wolfgand Wendt It is certified that error appears in the above-identified patent and that said Letters Patent is hereby corrected as shown below:

Col:

19 Claim 12, Line 14, before "denotes" insert --$R^{12}$--.

19 " Line 16 "$R^{15}$" should be --$R^{13}$--

Signed and Sealed this

Twelfth Day of January, 1993

Attest:

DOUGLAS B. COMER

Attesting Officer     Acting Commissioner of Patents and Trademarks